US010780643B2

(12) United States Patent
Greene et al.

(10) Patent No.: US 10,780,643 B2
(45) Date of Patent: *Sep. 22, 2020

(54) STEREOLITHOGRAPHY PRINTER MAPPING A PLURALITY OF PIXELS OF A CROSS-SECTIONAL IMAGE TO CORRESPONDING MIRRORS OF A PLURALITY OF MIRRORS OF A DIGITAL MICROMIRROR UNIT

(71) Applicant: HOLO, INC., Oakland, CA (US)

(72) Inventors: Richard M Greene, Oakland, CA (US); Michael Daum, Toronto (CA)

(73) Assignee: HOLO, INC., Newark, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/276,553

(22) Filed: Feb. 14, 2019

(65) Prior Publication Data
US 2020/0023587 A1 Jan. 23, 2020

Related U.S. Application Data

(63) Continuation of application No. 15/593,939, filed on May 12, 2017, now Pat. No. 10,252,468.
(Continued)

(51) Int. Cl.
G05B 19/42 (2006.01)
B29C 64/393 (2017.01)
(Continued)

(52) U.S. Cl.
CPC .......... B29C 64/393 (2017.08); B29C 64/129 (2017.08); B29C 64/386 (2017.08);
(Continued)

(58) Field of Classification Search
CPC .............................. G06F 17/50; G05F 19/4202
(Continued)

(56) References Cited

U.S. PATENT DOCUMENTS 5,403,680 A   4/1995  Otagawa et al.
5,418,608 A * 5/1995  Caimi ................ G01S 17/89
                                              348/139
(Continued)

FOREIGN PATENT DOCUMENTS

EP   2186625 A2   5/2010
EP   3194145 A2   7/2017
(Continued)

OTHER PUBLICATIONS

Authorized Officer Jolanda Hazeleer, International Search Report and Written Opinion in PCT/US2016/044765, dated Jan. 20, 2017, 13 pages.
(Continued)

Primary Examiner — Suresh Suryawanshi
(74) Attorney, Agent, or Firm — Wilson Sonsini Goodrich & Rosati

(57) ABSTRACT

Techniques and systems for 3D printing using mirrors that are oriented at about 45 degrees from an X-axis and Y-axis are described. A technique includes receiving an object model; rotating the object model about 45 degrees around the Z-axis; generating cross-sectional images of the rotated object model; mapping pixels of the cross-sectional images to corresponding mirrors of a digital micromirror device of an additive manufacturing apparatus to form additive-manufacturing images, wherein edges of the mirrors are oriented about 45 degrees from the X-axis of the digital micromirror device and about 45 degrees from the Y-axis of the digital micromirror; and providing the additive manufacturing images to generate a build piece corresponding to the object model. Other implementations can include corresponding systems, apparatus, and computer program products.

20 Claims, 5 Drawing Sheets

Related U.S. Application Data

(60) Provisional application No. 62/336,292, filed on May 13, 2016.

(51) Int. Cl.

| | | |
|---|---|---|
| *G05B 19/4099* | (2006.01) | |
| *B29C 64/129* | (2017.01) | |
| *B29C 64/386* | (2017.01) | |
| *B33Y 50/00* | (2015.01) | |
| *B33Y 10/00* | (2015.01) | |
| *B33Y 30/00* | (2015.01) | |

(52) U.S. Cl.
CPC .......... *G05B 19/4099* (2013.01); *B33Y 10/00* (2014.12); *B33Y 30/00* (2014.12); *B33Y 50/00* (2014.12); *G05B 2219/49023* (2013.01)

(58) Field of Classification Search
USPC .......................................................... 700/98
See application file for complete search history.

(56) References Cited

U.S. PATENT DOCUMENTS

| | | | |
|---|---|---|---|
| 5,982,342 A * | 11/1999 | Iwata ................. | H04N 13/349 13/349 |
| 6,500,378 B1 | 12/2002 | Smith et al. | |
| 6,867,774 B1 | 3/2005 | Halmshaw et al. | |
| 8,217,939 B1 | 7/2012 | Bonciu et al. | |
| 8,582,118 B2 | 11/2013 | Takahashi et al. | |
| 9,457,518 B2 | 10/2016 | Badhani et al. | |
| 9,987,808 B2 | 6/2018 | Archer et al. | |
| 10,252,468 B2 | 4/2019 | Greene et al. | |
| 10,354,445 B2 | 7/2019 | Greene et al. | |
| 2007/0107615 A1 | 5/2007 | Miyagawa et al. | |
| 2010/0125356 A1 | 5/2010 | Shkolnik et al. | |
| 2013/0297059 A1 | 11/2013 | Grifith et al. | |
| 2014/0087140 A1 | 3/2014 | Benson et al. | |
| 2014/0306955 A1 | 10/2014 | Dionne et al. | |
| 2015/0137426 A1 | 5/2015 | Van et al. | |
| 2015/0302116 A1 | 10/2015 | Howell et al. | |
| 2016/0023403 A1 | 1/2016 | Ramos et al. | |
| 2016/0185045 A1 | 6/2016 | Linnell et al. | |
| 2016/0240003 A1 * | 8/2016 | Frayne ................. | B29C 64/393 |
| 2017/0061602 A1 * | 3/2017 | Jang ..................... | H04N 19/137 |
| 2017/0102679 A1 | 4/2017 | Greene et al. | |
| 2017/0283766 A1 | 10/2017 | Hribar et al. | |
| 2017/0297099 A1 | 10/2017 | Gibson et al. | |
| 2017/0326807 A1 | 11/2017 | Greene et al. | |
| 2018/0020196 A1 | 1/2018 | Terada et al. | |
| 2018/0071988 A1 | 3/2018 | Emamjomeh et al. | |
| 2018/0086003 A1 | 3/2018 | Greene et al. | |
| 2018/0194066 A1 | 7/2018 | Ramos et al. | |
| 2018/0215098 A1 | 8/2018 | Marozin et al. | |

FOREIGN PATENT DOCUMENTS

| | | |
|---|---|---|
| WO | WO-2016022336 A2 | 2/2016 |
| WO | WO-2017062630 A1 | 4/2017 |

OTHER PUBLICATIONS

Co-pending U.S. Appl. No. 16/432,336, filed Jun. 5, 2019.
Hadipoespito et al. Digital Micromirror Device Based Microstereolithography for Micro Structures of Transparent Photopolymer and Nanocomposites. Solid Freeform Fabrication Proceedings. Aug. 19, 2003. pp. 13-24.
Karl, et al. TI DLP® 'Diamond' Pixel. Karl Guttag on Technology, Feb. 2016, [online] (retrieved from http://www .kguttag. com/20 12/02/09/ti -dip-diamond -pixel/), 11 pages.
Lee et al. Development of a 3D printer using scanning projection stereolithography. Sci Rep. Apr. 23, 2015;5:9875.
Paul, et al. Rapid Prototyping & Manufacturing: Fundamentals of StereoLithography, Society ofManufacturing Engineers, Jan. 1992, pp. 87-97.
Rezai et al. 1.2.4. Stereolithography. Sterolithography—an overview. Science Direct. 2012. Printed Oct. 24, 2018. 9 pages. URL:< https://www.sciencedirect.com/topics/materials-science/ stereolithography.
Sun et al. Projection micro-stereolithography using digital micromirror dynamic mask. Sensors and Actuators A: Physical. vol. 121, Issue 1, May 31, 2005, pp. 113-120.
U.S. Appl. No. 15/287,205 Notice of Allowance dated Apr. 24, 2019.
U.S. Appl. No. 15/287,205 Office Action dated Oct. 1, 2018.
U.S. Appl. No. 15/593,939 Notice of Allowance dated Dec. 20, 2018.
U.S. Appl. No. 15/593,939 Notice of Allowance dated Nov. 16, 2018.
Co-pending U.S. Appl. No. 16/732,777, filed Jan. 2, 2020.

* cited by examiner

STEREOLITHOGRAPHY PRINTER MAPPING A PLURALITY OF PIXELS OF A CROSS-SECTIONAL IMAGE TO CORRESPONDING MIRRORS OF A PLURALITY OF MIRRORS OF A DIGITAL MICROMIRROR UNIT

CROSS-REFERENCE TO RELATED APPLICATION

This application is a continuation application of U.S. patent application Ser. No. 15/593,939, filed on May 12, 2017, which application claims priority to U.S. Provisional Application No. 62/336,292, filed on May 13, 2016, which applications are incorporated herein by reference in their entirety.

BACKGROUND

This specification relates to three-dimensional (3D) printing.

Photopolymer-based 3D printers that use bottom-up illumination can project light upwards through an optically transparent window into a vat of photo-reactive resin to cure at least a portion of the resin. Such printers can build a 3D structure by forming one layer at a time, where a subsequent layer adheres to the previous layer. The light can be patterned to cause some portions of the resin to cure and other portions not to cure, thereby creating substructures of the 3D structure.

SUMMARY

This specification describes technologies relating to 3D printing using mirrors that are oriented away from an X-axis and Y-axis. In one aspect, a described technique includes receiving an object model that identifies a plurality of vertices in a coordinate space having a Z-axis orthogonal to an X-axis and a Y-axis; rotating the object model by an angle around the Z-axis in the coordinate space; generating cross-sectional images of the rotated object model, each cross-sectional image comprising a plurality of pixels, each pixel having an X-value along the X-axis of the coordinate space and a Y-value along the Y-axis of the coordinate space; mapping pixels of the cross-sectional images to corresponding mirrors of a digital micromirror device of an additive manufacturing apparatus to form additive-manufacturing images, wherein the digital micromirror device comprises a plurality of mirrors each having an X-value along an X-axis of the digital micromirror device and a Y-value along a Y-axis of the digital micromirror device, and wherein edges of the mirrors are oriented at the angle from an axis that is one of the group consisting of the X-axis of the digital micromirror device and the Y-axis of the digital micromirror; and providing the additive manufacturing images to generate, by the additive manufacturing apparatus, a build piece corresponding to the object model. Other implementations can include corresponding systems, apparatus, and computer program products.

These and other implementations can include one or more of the following features. Implementations can include printing, by the additive manufacturing apparatus, the build piece corresponding to the object model using the additive-manufacturing images to engage sets of mirrors of the digital micromirror device. Printing, by the additive manufacturing apparatus, the build piece corresponding to the object model can include iteratively printing layers of the build piece, wherein for each layer of the build piece, mirrors of the digital micromirror device are selectively engaged according to corresponding pixel values in a corresponding additive manufacturing image. Mapping pixels of the cross-sectional images to corresponding mirrors of the digital micromirror device of the additive manufacturing apparatus can include for each pixel of the cross-sectional images, finding the X-value along the X-axis of the digital micromirror device by performing a first function; and for each pixel of the cross-sectional images, finding the Y-value along the Y-axis of the digital micromirror device by performing a second function. The first function can be TotalColumns/2−INT(y/2)+INT((x+((y+1) % 2))/2), where x is the X-value of a pixel, y is the Y-value of a pixel, TotalColumns is a maximum X-value of the digital micromirror plus one, INT( ) is a function that truncates to a nearest integer and % is a modulus operator. The second function can include x+y−TotalColumns, where x is the X-value of a pixel, y is the Y-value of a pixel, and TotalColumns is a maximum X-value of the digital micromirror plus one. Generating cross-sectional images of the rotated object model can include slicing the object model at an image resolution that is based on the resolution of the digital micromirror device. The image resolution can be greater than the resolution of the digital micromirror device. The image resolution can have a length in pixels and a width in pixels that are each a width in mirrors of the digital micromirror device plus half a height in mirrors of the micromirror device in mirrors. The additive manufacturing apparatus can provide at least a first mode of printing that performs filtering and resampling and a second mode of printing that does not perform filtering and resampling. Implementations can include receiving an indication that the object model should be printed with the second mode; and wherein the rotating, generating, and mapping are performed responsive to receiving the indication that the object model should be printed with the second mode. Implementations can include applying image processing to the cross-sectional images.

A system can include an additive-manufacturing device comprising a digital micromirror device. The additive-manufacturing device can be configured to print build pieces from a photo-reactive resin by selectively applying energy to successive layers of the resin with filtering and resampling, and print build pieces from a photo-reactive resin by selectively applying energy to successive layers of the resin without filtering and resampling, wherein mirrors of the digital micromirror device can be arranged in a diamond orientation, and wherein the digital micromirror device can be configured to operate in a first mode with filtering and resampling and in a second mode without filtering and resampling. The system can include a data processor configured to receive an object model that identifies a plurality of vertices in a coordinate space having a Z-axis orthogonal to an X-axis and a Y-axis; rotate the object model about 45 degrees around the Z-axis in the coordinate space; generate cross-sectional images of the rotated object model, each cross-sectional image comprising a plurality of pixels, each pixel having an X-value along the X-axis of the coordinate space and a Y-value along the Y-axis of the coordinate space; map pixels of the cross-sectional images to corresponding mirrors of a digital micromirror device of the additive manufacturing device to form additive-manufacturing images, wherein the digital micromirror device comprises a plurality of mirrors each having an X-value along an X-axis of the digital micromirror device and a Y-value along a Y-axis of the digital micromirror device, and wherein edges of the mirrors are oriented about 45 degrees from the X-axis of the digital micromirror device and about 45 degrees from the Y-axis of the digital micromirror.

Particular implementations disclosed herein can provide one or more of the following advantages. A described technology can orient a build piece to be printed with a digital micromirror device having diamond-oriented micromirrors. A described technology can be used to more accurately print a 3D structure.

Details of one or more implementations are set forth in the accompanying drawings and the description below. Other features and advantages may be apparent from the description and drawings, and from the claims.

DESCRIPTION OF DRAWINGS

Like reference symbols in the various drawings indicate like elements

DETAILED DESCRIPTION

Some 3D printers use a digital micromirror device to aim light used to harden a photopolymer or other build material. In some cases, mirrors of the digital micromirror are arranged in a two-dimensional grid with each mirror oriented at about 45 degrees from the X-axis and Y-axis of the grid. To print a build piece in such a 3D printer, data related to a model to be printed may be reoriented to match this same orientation of the mirrors. In this way, an advantage of the technology can be realized in that artifacts from filtering and resampling to accommodate the mirror orientation may be reduced or eliminated in build pieces created by the 3D printer, thereby providing higher resolution in the build piece with higher fidelity to the model.

Many commercially available digital micromirror devices and commercially available 3D printers are available only with mirrors oriented at about 45 degrees from the X-axis and Y-axis of the grid. The use of this technology allows for improved performance of those devices without requiring expensive or time-consuming modifications to the hardware of those devices. Instead, a comparatively cheaper and faster software-preprocessing step can be used to improve the performance. This technology can be used, for example, when the use of a device with mirrors oriented at about 45 degrees from the X-axis and Y-axis of the grid is a given or a design constraint that a system designer is not able to change.

Figure 1:
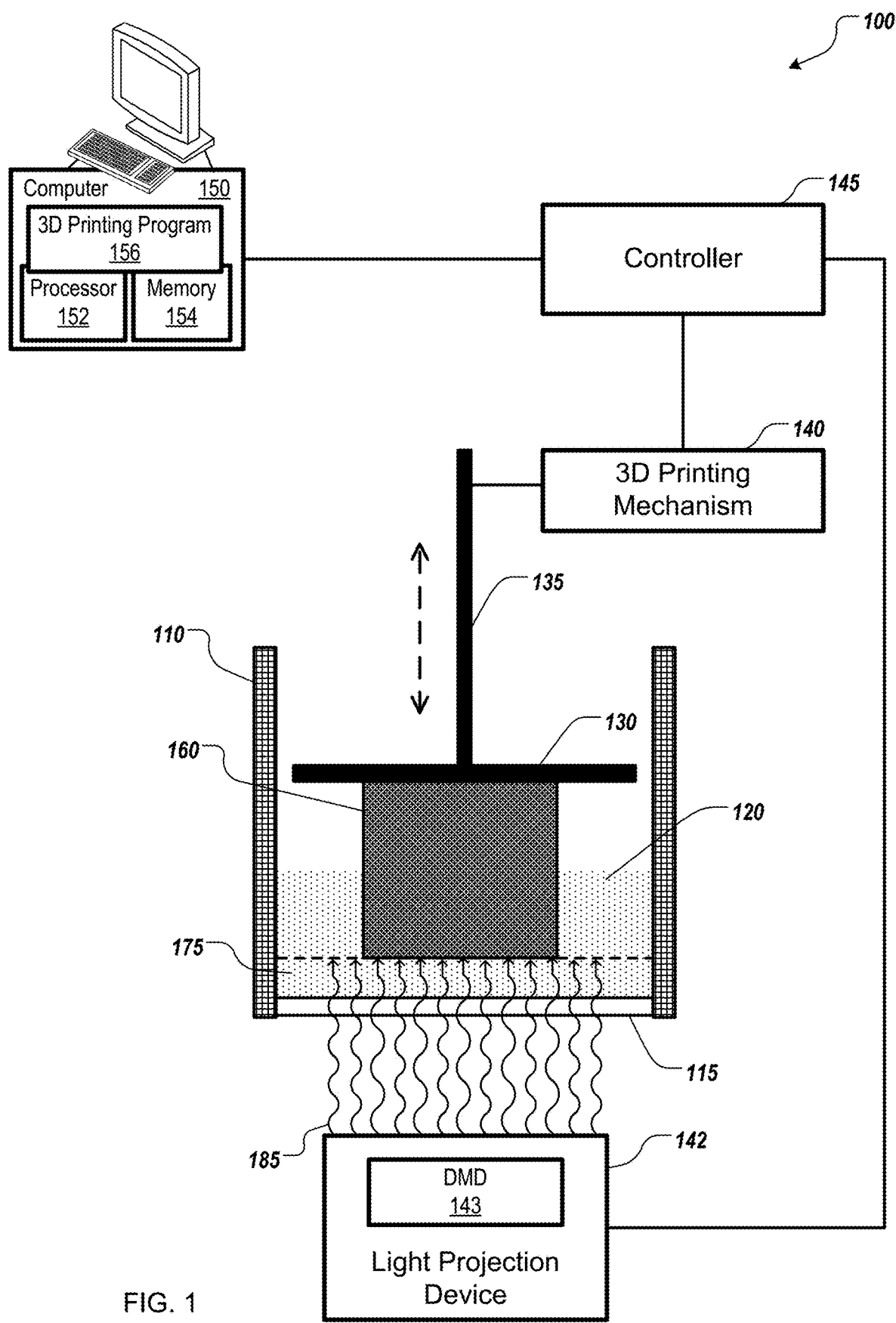
FIG. 1 shows an example of a 3D printing system coupled with a computer.

FIG. 1 shows an example of a 3D printing system 100 coupled with a computer 150. The computer 150 can provide information about a 3D structure to the 3D printing system 100 for printing. The computer 150 can communicate with a controller 145 of the printing system 100 via a wireline or wireless connection. The controller 145 can include integrated circuit technology, such as an integrated circuit board with embedded processor and firmware to control various system components such as a 3D printing mechanism 140 and a light projection device 142.

The system 100 includes a vat 110 to hold a liquid 120, which includes one or more photo-reactive resins. The vat 110 includes a window 115 in its bottom through which light is transmitted to cure resin to form a 3D printed build piece 160 in a layer-by-layer build process. The 3D printed build piece 160 is shown as a block, but as will be appreciated, a wide variety of complicated shapes can be 3D printed. The build piece 160 is 3D printed on a build plate 130, which can be connected by a rod 135 to a 3D printing mechanism 140. The printing mechanism 140 can include various mechanical structures for moving the build plate 130 within the vat 110. This movement is relative movement, and thus the moving piece can be build plate 130, the vat 110, or both, in various implementations.

In some implementations, the window 115 includes a material such as polydimethylsiloxane (PDMS) to prevent resin from adhering to the window 115 during a curing procedure. Other techniques can be used to prevent resin from adhering to the window 115 such as a photo-inhibition technique that prevents resin from curing within a section of the vat 110 immediately above the window 115, while allowing resin to cure further away from the window 115.

The light projection device 142 can be positioned below the window 115. The controller 145 can operate the light projection device 142 to project a pattern of light 185 into the vat 110 to form substructures of the build piece 160. The light 185 has a wavelength which is used to create the 3D build piece 160 on the build plate 130 by curing the photo-reactive resin in the liquid 120 within a photo-initiation region 175, in accordance with a defined pattern or patterns. The wavelength can be selected based on the characteristics of the photo-reactive resin in the liquid 120. The build plate 130 can start at a position near the bottom of the vat 110, and varying patterns of the light 185 are directed through the window 115 to create layers of the solid build piece 160 as the build plate 130 is raised out of the vat 110 by the printing mechanism 140. In some implementations, the printing mechanism 140 can employ a stepwise separation mechanism that raises the build plate 130 by a predetermined amount after each layer completion, e.g., after a predetermined curing time. In some implementations, the printing mechanism 140 can include mechanisms to aid in separation, e.g. by providing a rotation out of the plane of FIG. 1. In some implementations, the printing mechanism 140 can employ a continuous separation mechanism that continuously raises the build plate 130.

The light projection device 142 can be configured to modulate its light output based on a two dimensional grid of pixels. In some implementations, the light projection device 142 can include a pixel addressable filter to allow controlled amounts of light to pass at some pixel locations while blocking or deflecting light at other pixel locations from a light source within the light projection device 142. A pixel addressable filter can include a digital micromirror device (DMD) 143.

The DMD 143 can include mirrors that each correspond to one of the pixels in the grid of pixels. Each of the mirrors can have an X-value along an X-axis of the DMD 143 and a Y-value along a Y-axis of the DMD 143. The X-values may be denoted as columns and the Y values may be denoted as rows, and successive rows and/or columns may be laterally offset from adjacent rows or columns. Edges of the mirrors can be oriented about 45 degrees (e.g., 45+/−10 degrees) from the X-axis of the DMD 143 and about 45 degrees (e.g., 45+/−10 degrees) from the Y-axis of the DMD 143. As a result, the mirrors may be said to be diamond oriented. Alternatively, some DMDs may be configured with mirrors that are parallel to the X-axis or Y-axis. In many cases, these DMDs require more space, which may result in larger 3D printing system 100. By using the DMD 143 with diamond oriented mirrors, a comparatively smaller 3D printing system 100 may be designed and manufactured.

A controller within the DMD can selectively engage the mirrors according to some data received from the controller 145. This data can include, for example, a two dimensional grid of data values indicating engaged or disengaged mirrors, a video stream, or other data.

The DMD 143 can be configured to operate in multiple modes. For example, in one mode, the DMD 143 can operate with low-pass filtering and resampling. In this mode, sometimes called video mode, the amount of light allowed to pass at a pixel location is influenced by the amount of light allowed to pass at adjacent or nearby pixel locations. This can reduce, for example, hard transitions in which one pixel allows large amounts of light while a neighbor pixel allows little or no light. In another example mode, sometimes called pattern mode, the DMD 143 can operate without filtering and resampling. In this mode, the amount of light at a pixel location is not influenced by the amount of light allowed to pass at adjacent or nearby pixel locations. This can produce, for example, the kinds of hard transitions that are reduced by filtering and resampling.

Different print jobs can produce more or less desirable results depending on the mode of operation of the DMD 143. For example, some object models may have straight geometric segments, and printing in pattern mode can produce a build piece 160 with corresponding straight geometry with little or no artifacts from the diamond orientation of the mirrors. The same object model, if printed in video mode, can produce a build piece 160 with undesirable artifacts caused by the filtering and resampling. In another example, an object model may include small features or smooth surfaces. For example, geometry created from fonts can include serifs and other small features that terminate in acute angles. Printing these object models in video mode can produce better results by printing these small features with more broadening than printing in pattern mode. Video mode may also produce better results when printing smooth surfaces. As such, the 3D printing system 100 can be configured to print in either of the two modes. The selection of the two modes can be made, for example, by analysis of the object model to be printed, based on user input, etc.

In some implementations, the light projection device 142 can include a pixel addressable light source to produce controlled amounts of light at some pixel locations and not produce light at other pixel locations. In some implementations, the light projection device 142 includes a liquid crystal display (LCD) device, discrete light emitting diode (LED) array device, laser, or a digital light processing (DLP) projector.

In some implementations, the 3D printing system 100 can include sensors and be designed to modify its operations based on feedback from these sensors. For example, the 3D printing system 100 can use closed loop feedback from sensors in the printer to improve print reliability. Such feedback sensors can include one or more strain sensors on the rod 135 holding the build plate 130 to detect if adhesion has occurred and stop and/or adjust the print, and one or more sensors to detect polymer conversion, such as a spectrometer, a pyrometer, etc. These sensors can be used to confirm that the 3D printing is proceeding correctly, to determine if the resin has been fully cured before the 3D printing system 100 proceeds to the next layer, or both. Moreover, in some implementations, one or more cameras can be used along with computer vision techniques to check that the print is proceeding as expected. Such cameras can be positioned under the vat 110 to examine the output, e.g., 3D printed layer, which the controller 145 can compare to the input, e.g., mask or layer image.

The computer 150 can include a processor 152, memory 154, and interfaces such as a network interface or a Universal Serial Bus (USB) interface. The processor 152 can be one or multiple processors, which can each include multiple processor cores. The memory 154 can include volatile memory such as Random Access Memory (RAM). The memory 154 can include non-volatile memory such as flash memory or read-only memory (ROM). The computer 150 can include one or more types of computer storage media and devices, which can include the memory 154, to store instructions of programs that run on the processor 152. For example, a 3D printing program 156 can be stored in the memory 154 and run on the processor 152 to implement the techniques described herein. In some implementations, the controller 145 can include the 3D printing program 156 or a portion thereof.

The 3D printing program 156 can transform a digital model into a sequence of layers that collectively describe the build piece 160. The 3D printing program 156 can access a file containing mesh data that represents a digital model. Mesh data can include descriptions of geometric shapes such as polygons and their locations within the digital model. The 3D printing program 156 can map the digital model into three-dimensional discrete points called voxels. In some implementations, a voxel can be mapped to a pixel within a layer. In some implementations, the digital model can be sliced into grids of pixels and each pixel represents a voxel.

Figure 2A:
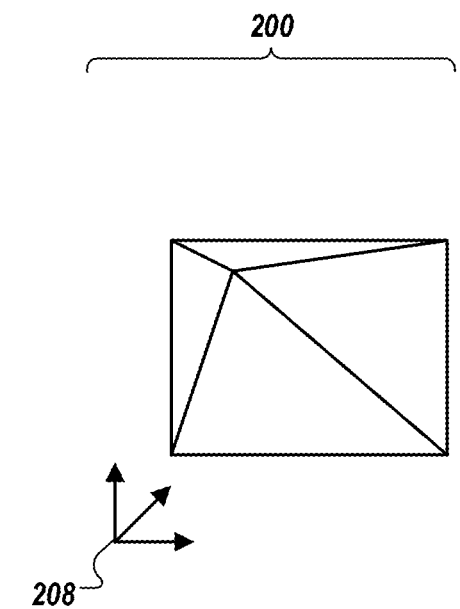
FIGS. 2A-2C show data that may be used to selectively engage micromirros of a digital micromirror device used in a 3D printing system.
Figure 2A:
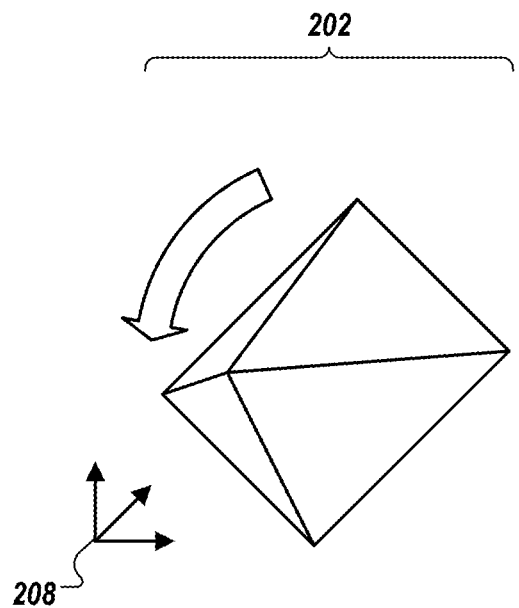
Figure 2B:
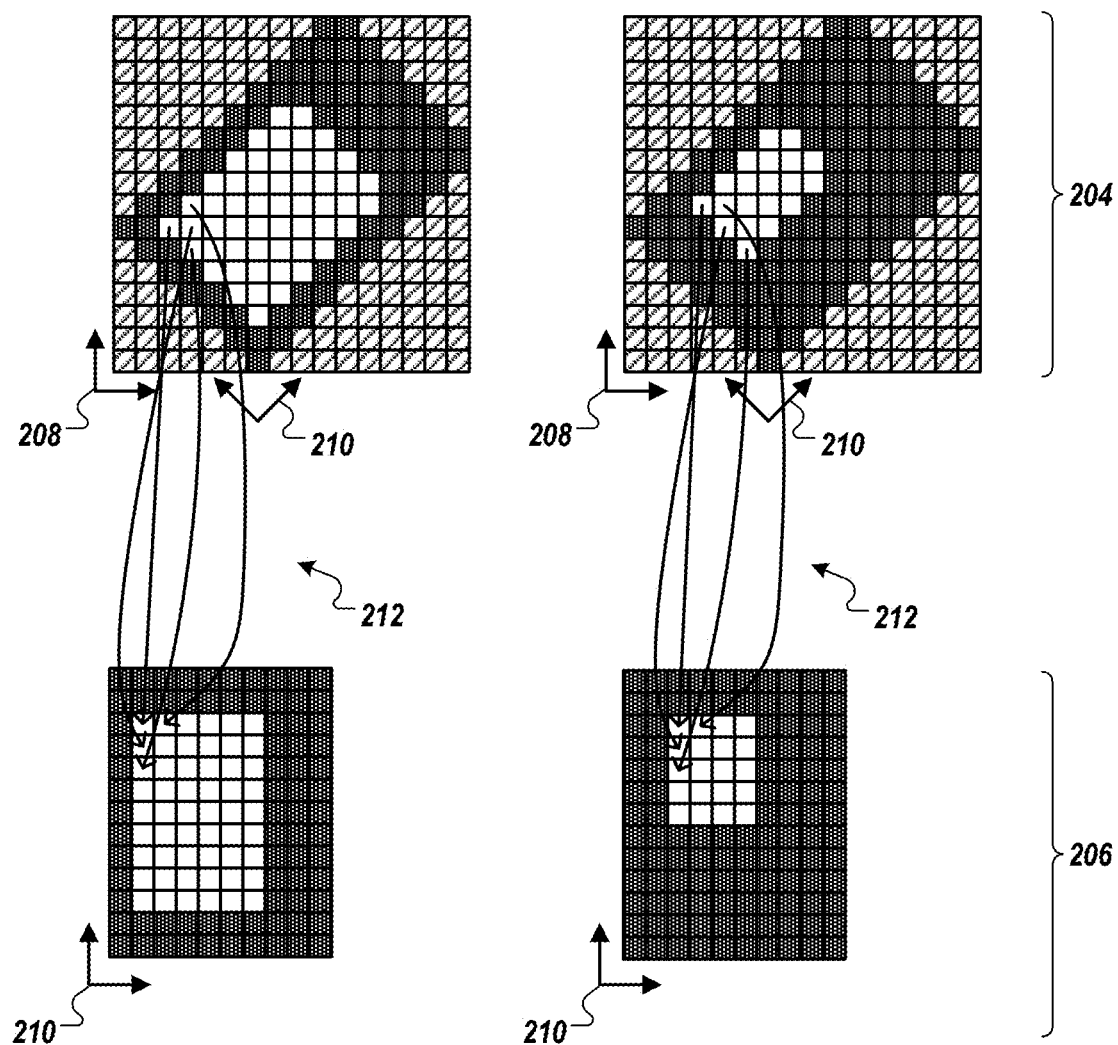
Figure 2C:
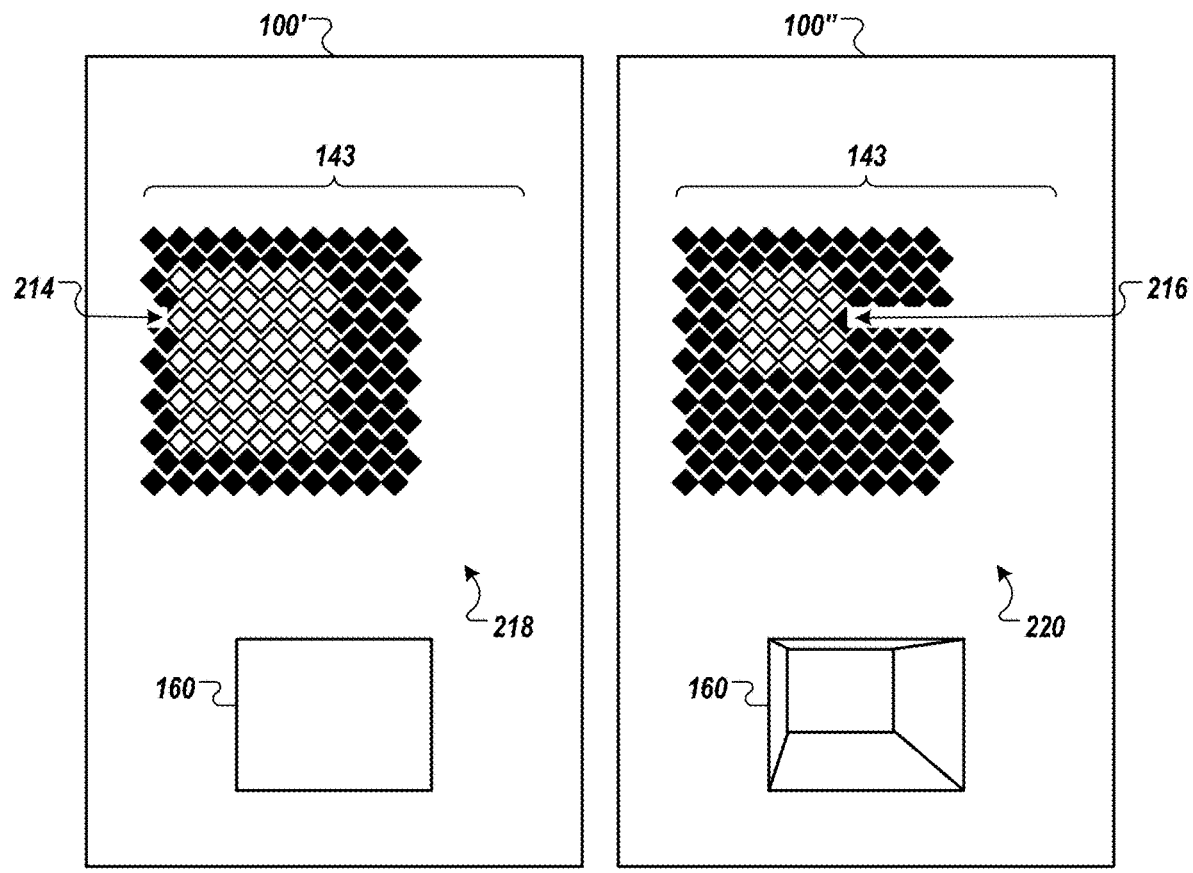

FIGS. 2A-2C show data 200-206 that can be used to selectively engage micromirros of the DMD 143 used in the 3D printing system 100. For example, the data 202-206 can be generated and used by the computer 150 and/or the controller 145 to print a build piece from an object model.

Data 200 includes an object model that identifies a plurality of vertices in a coordinate space having a Z-axis orthogonal to an X-axis and a Y-axis. As shown in this example, the object model is a five-sided polyhedron that has some edges that align with the axes of the coordinate space. This data 200 include x, y, and z coordinates from an origin 208 for each of the vertices, or can take any other technologically appropriate format.

Data 202 includes the object model of the data 202 rotated 45 degrees about a line in the Z-direction in the coordinate space. For example, the computer 150 can apply a rotation matrix to the x, y, and z coordinates of each original vertex of the polyhedron, which can result in new locations for each vertex without changing the shape of the polyhedron. This rotation can be in either the positive or negative direction.

Data 204 includes cross-sectional images of the rotated object model of the data 202. Each of the cross-sectional images includes a plurality of pixels, each pixel having an X-value along the X-axis of the coordinate space and a Y-value along the Y-axis of the coordinate space. The cross-sectional images may or may not include the Z-direction. Cross-sectional images may, for example, represent one increment in the Z-direction, and may contain two-dimensional pixels or three-dimensional voxels. In the representation shown, only two such cross-sectional images are shown for clarity, although many more cross-sectional images can be used. Similarly, a coarse two-dimensional grid of pixels is shown, but a finer grid of smaller pixels can be used.

Each of the cross-sectional images show a cross-section of the object model at a particular plane in the Z-axis of the coordinate space. This is sometimes called a slice. The pixels of the cross-section can be set to one of two colors or values (e.g., black or white, 0 or 1) depending on if they fall within the object model. For pixels that are partly within the object model and partly out of the object model, an intermediate color or value can be used (e.g., a grayscale or percentage). This intermediate color or value can vary according to the percentage of pixel filled by the object model, so a more full pixel can be assigned a brighter color or higher percentage.

The cross-sectional images are shown with a darkly-shaded rectangular area that may be called an active area and four diagonal-hatched triangular areas. The active area can be aligned along the X-axis and Y-axis of an origin 210, which is oriented by the same angle as the mirrors of the DMD 143 are oriented. In this example, this same angle by which both the origin 210 and the mirrors of the DMD 143 are oriented is 45 degrees or about 45 degrees. However, in some other configurations, the origin 210 and the DMD 143 may both be oriented by a different angle. For example, if the DMD 143 is replaced by a DMD having mirrors oriented at a 30-degree angle, the origin 210 may also be oriented by 30 degrees or about 30 degrees.

The active area can have a size, in pixels, that matches the size, in mirrors, of the DMD 143. The overall size of the cross-sectional images can be set so that the cross-sectional images can contain the darkly shaded rectangular area. In one example, the DMD 143 can have 912 columns of mirrors and 1140 rows of mirrors. In this example, the size of the cross-sectional images can be 1482 pixels in both dimensions. In some cases, the size of the cross-sectional images can be determined by adding the number of columns of the DMD 143 to half the number of rows of the DMD 143 (e.g., 912+1140/2=1482) to determine the resolution on each of the X and Y axes.

Data 206 includes additive-manufacturing images created from the cross-sectional images of the data 204. In the representation shown, only two such additive-manufacturing images are shown for clarity, though many more additive-manufacturing images can be used. Similarly, a coarse two-dimensional grid of pixels is shown, but a finer grid of smaller pixels can be used.

The additive-manufacturing images can have a size, in pixels, that matches the size, in pixels, of the active area and that matches the size, in mirrors, of the DMD 143. The controller 145 or the computer 150 can map 212 the colors or pixel values of the active area of the cross-sectional images to pixel values of the additive-manufacturing images. In general terms, this means that the upper-left (e.g., [0,0]) pixel of the additive manufacturing image is given the value of the upper-left pixel of the corresponding active area. Then the next pixel (e.g., [1,0]) of the additive manufacturing image is given the value of the next pixel of the corresponding active area. Example functions that may be used to perform this mapping 212 are described below. A mapping 212 for only some of the pixels is shown. However, a mapping for most or all pixels of the active area and additive-manufacturing images can be used. Any pixel in the cross-sectional image that cannot be mapped to a pixel in the additive-manufacturing image is outside of the active area and may therefore be ignored.

Like the active area, the additive-manufacturing images can be aligned along the X-axis and Y-axis of an origin 210. Effectively, this mapping 212 of pixels from the active area to the additive-manufacturing images can reverse the rotation applied to the object model in the data 202. The additive-manufacturing images can be created to contain only one of two colors or values, with no pixels having an intermediate color or value. For this mapping, pixels that are partly within the object model and partly out of the object model can be mapped to be within or out of the object model. For example, a pixel with a percentage above 50% can be assigned to be within the object model as more than half of the pixel is within the object model. The additive-manufacturing images can also be created to contain a range of colors or values, with intermediate values corresponding to pixels that are partly within the object model and partly out of the object model.

3D printing systems 100' and 100" show the DMD 143 and the build piece 160 of the 3D printing system 100 at two points in time that correspond to the two additive-manufacturing images shown in FIG. 2B. Engaged mirrors 214 and 216 correspond to pixel locations in the additive manufacturing images that contain one value (white, 1, etc.) and unengaged mirrors 218 and 220 correspond to pixel locations in the additive manufacturing images that contain another value (black, 0, etc.) Although shown at different scales for clarity here, the additive-manufacturing images may have the same numbers of rows and columns of pixels as the number of rows and columns of mirrors of the DMD 143.

In the 3D printing systems 100', a set of mirrors 214, shown in white, of the DMD 143 are engaged to print the first layer of the build piece 160. The unengaged mirrors 218 are shown in black. In the 3D print system 100", a different set of mirrors 216 of the DMD 143 are engaged to print a higher layer of the build piece. In this example, the set of engaged mirrors 216 in the 3D printing system 100" is a subset of the engaged mirrors 214 in the 3D print system 100', but this is not required.

The engaged mirrors 214 and 216 of the 3D printing systems 100' and 100" reflect light of the light projection device 142 to selectively harden the liquid 120. The non-engaged mirrors do not reflect light into the liquid 120, and thus do not harden any of the liquid 120.

Figure 3:
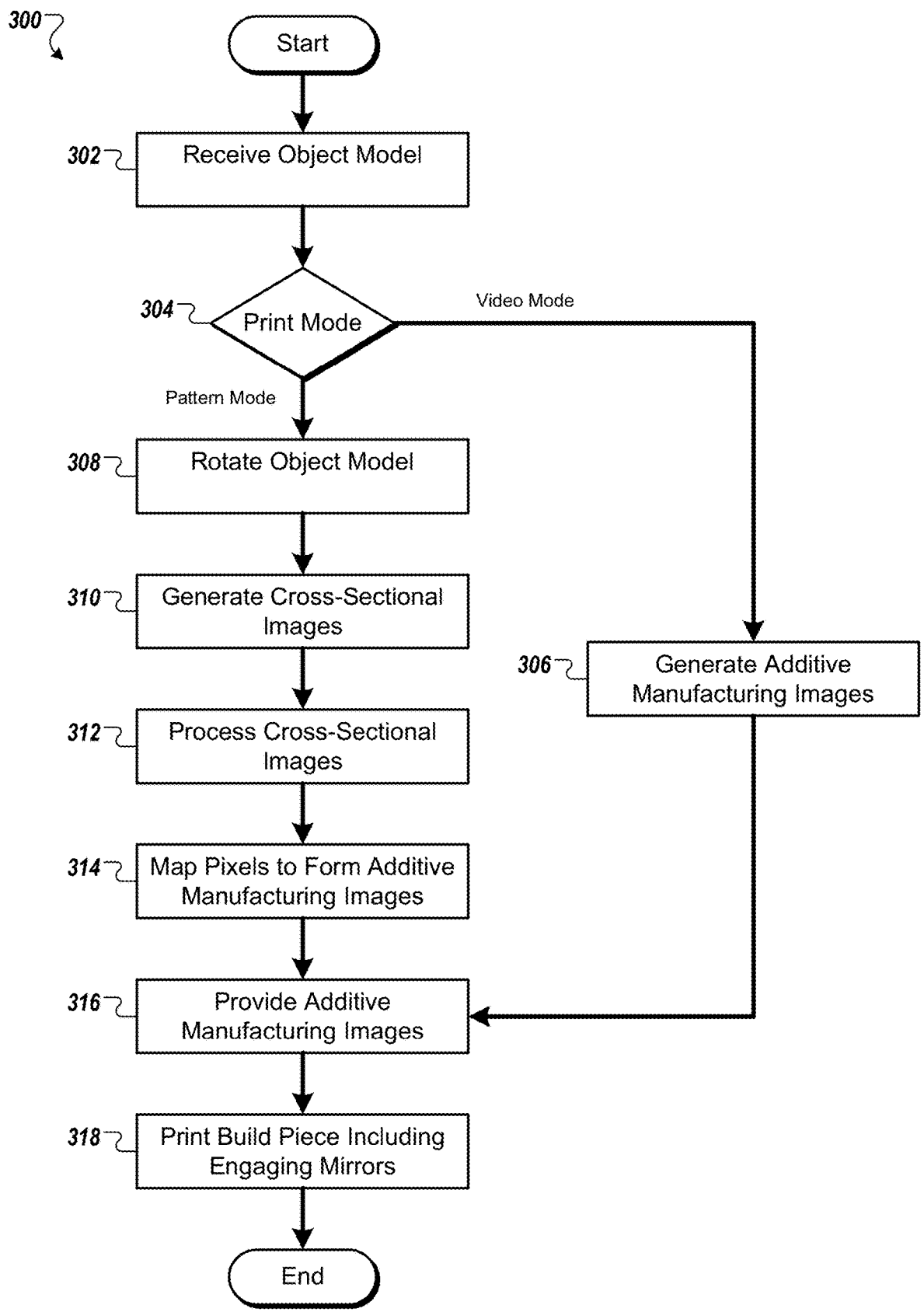
FIG. 3 is a flowchart of an example of a process that transforms a digital model into data suitable for rendering on a 3D printer.

FIG. 3 is a flowchart of an example of a process 300 that transforms a digital model into data suitable for rendering on a 3D printer. The process 300 can be performed by, for example, computing devices and/or 3D printers having digital micromirror devices where mirrors are oriented about 45 degrees. For clarity, the process 300 will be described with reference to the printing system 100 and the data 200-206. However, other systems may be used to perform the process 300 or similar processes.

An object model is received 302. For example, the computer 150 can receive the data 200 from a local or remote data source. This can include loading a removable memory device into the computer 150 or accessing a data source via a computer network.

The object model identifies a plurality of vertices in a coordinate space having a Z-axis orthogonal to an X-axis and a Y-axis. For example, the object model can be stored in a file format such as DWG Fusion 360 Archive, Inventor Parts, STL, or another format that identifies these vertices. The object model can be stored in American Standard Code for Information Interchange (ASCII), as binary data, or in another appropriate form.

In some cases, an initial orientation can be determined by the computer 150. This can include an automated process or user interaction. For example, some object models can be predicted to print more quickly in some orientations, and the user or an automated process can set the initial orientation to take advantage of this prediction.

A print mode is selected 304. For example, the additive manufacturing apparatus can provide multiple printing modes. In a first mode of printing, the additive manufacturing apparatus can perform filtering and resampling and a second mode of printing does not perform filtering or resampling. In some cases, the print mode may be selected with user input. For example, a user may examine the object model to determine if it contains features that will be printed more faithfully with filtering and resampling or without filtering and resampling, and the user can enter the corresponding mode selection. In some cases, the print mode may be selected without user input. For example, the computer 150 can examine the object model and select a print mode based on an automated test. This test can include determining if small features, smooth surfaces, or other similar features are present. If so, the test can indicate the print mode with filtering and resampling. If such features are not present, the test can indicate that the print mode without filtering and resampling should be used. Other types of tests are possible as well.

If the first print mode, which performs filtering and resampling, is selected, additive-manufacturing images are generated 306. For example, the computer 150 can slice the object model in the data 202 at regular intervals along the Z-axis of the coordinate space. At each interval, the computer 150 can generate the data 204 with pixel values or colors based on the pixel being within the object model at that interval.

If the second print mode, which does not necessarily perform filtering and resampling, is selected, rotating 306, generating 308, and mapping 312 are performed responsive to receiving the indication that the object model should be printed with the second mode. In some implementations, process 312 is also preformed responsive to receiving the indication that the object model should be printed with the second mode. Filtering and resampling may be performed as part of process 312.

The object model is rotated 308. For example, the computer 150 can modify the data 200 to rotate object model about 45 degrees, in either direction, around the Z-axis in the coordinate space to create the data 202. As used in this document, "about 45 degrees" includes a range around 45, from 35 to 55.

Cross-sectional images are generated 310. For example, the computer 150 can slice the object model in the data 202 at regular intervals along the Z-axis of the coordinate space. At each interval, the computer 150 can generate the data 204 with pixel values or colors based on the pixel being within the object model at that interval.

Each cross-sectional image has a plurality of pixels, each pixel having an X-value along the X-axis of the coordinate space and a Y-value along the Y-axis of the coordinate space. The cross-sectional images can have an image resolution that is based on the resolution of the digital micromirror device. For example, an image resolution that is larger than the resolution of the digital micromirror device can be found by rotating an active area of a cross-sectional image. In some cases, the image resolution may have a length in pixels and a width in pixels that are each equal to half the number of rows of mirrors of the DMD 143 plus the number of columns of mirrors of the DMD 143. In some cases, a larger image resolution may be used. A larger image resolution will still be large enough to include an active area oriented at the same angle as the mirrors of the DMD 143 are oriented.

The cross-sectional images are processed 312. For example, the computer 150 can alter cross-sectional images to compensate for differences in image size, to normalize intensity variations in the print system 100, to smooth boundaries, or to enhance fine details, etc. For example, as previously described, some fine details may not be printed well without filtering and resampling. In some cases, this may be because a single pixel is to be printed with no or few adjacent pixels printed. This can result in reduced spill-over light compared to if more adjacent pixels where printed. In such a case, the cross-sectional images can be processed to reduce this artifact. For example, the intensity of light applied to such pixels and/or the time for which they are exposed can be increased.

Pixels are mapped 314 from the cross-sectional images to corresponding mirrors of a digital micromirror device of an additive manufacturing apparatus to form additive manufacturing images. For example, the computer 150 can use the data 204 to form the data 206. To do so, the computer 150 can, for each pixel location $[X_1, Y_1]$ of the cross-sectional image, find a corresponding mirror location $[X_2, Y_2]$ of the digital micromirror device 143. The computer 150 can then copy the pixel value (e.g. black) from the cross-sectional image at pixel location $[X_1, Y_1]$ to the pixel in the additive-manufacturing image at pixel location $[X_2, Y_2]$.

For each pixel of the cross-sectional images, the computer 150 can find the X-value along the X-axis of the digital micromirror device by performing a first function and for each pixel of the cross-sectional images find the Y-value along the Y-axis of the digital micromirror device by performing a second function. The first function used can be TotalColumns/2−INT(y/2)+INT((x+((y+1) % 2))/2), where x is the X-value of a pixel, y is the Y-value of a pixel, TotalColumns is a maximum X-value of the digital micromirror plus one, INT( ) is a function that truncates to a nearest integer and % is a modulus operator. The second function used can be x+y−TotalColumns, where x is the X-value of a pixel, y is the Y-value of a pixel, and TotalColumns is a maximum X-value of the digital micromirror plus one.

The additive manufacturing images are provided 316 to the additive manufacturing apparatus to generate a build piece corresponding to the object model of data 206. For example, the computer 150 can pass the additive manufacturing images to the controller 145. A build piece is printed 318 by the additive manufacturing apparatus.

Printing 318, by the additive manufacturing apparatus, the build piece corresponding to the object model comprises iteratively printing layers of the build piece. For each layer of the build piece, sets of mirrors of the DMD 143 are selectively engaged according to corresponding pixel values in a corresponding additive manufacturing image. Consider an example in which the DMD 143 has a number of columns represented by TotalColumns and a number of rows represented by TotalRows. To selectively engage the mirrors of the mirrors of the DMD 143, a controller of the DMD 143 of an additive-manufacturing image and engage or not engage the mirror according to the pixel values. That is, the controller can examine pixels at locations [0,0], [0,1] [TotalColumns−1,TotalRows−1] and engage or not engage a mirror at [0,0], [0,1] . . . [TotalColumns−1,TotalRows−1] based on the pixel value (e.g., engaged for white or 1 and not engaged at black or 0). Thus, a layer of the build piece is printed having the shape shown by the corresponding additive manufacturing image. Although a particular order, number, and type of steps is described here, other orders, numbers, and types of steps can be performed, or performed by other systems. For example, some of the actions described as being performed by the computer 150 can be performed by the controller 145, remote servers, etc. In other examples, the additive manufacturing images may never be provided 316 to print 318 a build piece, the cross-sectional images can never be processed 312, etc.

In some examples, an additive manufacturing device that does not support video mode may be used. The selection 304 of print mode may not be needed, or may select from print modes that all do not use filtering and resampling. In such cases, the generating 306 is not performed.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by, and/or under the control of, one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Other embodiments are within the scope of the following claims.

What is claimed is:

1. A method for printing an object, comprising:
   (a) receiving an object model corresponding to said object in a coordinate space;
   (b) using said object model to generate a cross-sectional image, wherein said cross-sectional image is rotated at an angle relative to a cross-section of said object model in said coordinate space, and wherein said cross-sectional image comprises a plurality of pixels; and
   (c) mapping said plurality of pixels of said cross-sectional image to corresponding mirrors of a plurality of mirrors of a digital micromirror unit of an additive manufacturing device, to provide an additive manufacturing image usable by said additive manufacturing device to print at least a portion of said object.

2. The method of claim 1, wherein sad plurality of mirrors is arranged in a two-dimensional grid, wherein edges of each mirror of the plurality of mirrors are oriented at said angle relative to said two-dimensional grid.

3. The method of claim 1, wherein said angle is about 45 degrees.

4. The method of claim 1, further comprising, in (c), for each pixel of said plurality of pixels, (i) performing a first function to determine an X-value along an X-axis of the digital micromirror unit and (ii) performing a second function to determine a Y-value along a Y-axis of the digital micromirror unit.

5. The method of claim 1, wherein an image resolution of said cross-sectional image is based on a resolution of said digital micromirror unit.

6. The method of claim 5, wherein said image resolution is greater than said resolution of said digital micromirror unit.

7. The method of claim 5, said image resolution has a first dimension in pixels and a second dimension in pixels, wherein each of said first dimension and said second dimension is determined by a number of mirrors along a width of said digital micromirror unit plus half a number of mirrors along a height of said digital micromirror unit.

8. The method of claim 1, further comprising, in (b), performing filtering and resampling of one or more pixels of said plurality of pixels of said cross-sectional image.

9. The method of claim 8, further comprising (i) analyzing at least a portion of said object model and (ii) determining whether to perform said filtering and said resampling based at least in part on said analyzing.

10. The method of claim 9, wherein said analyzing comprises analyzing one or more features or surfaces of said at least said portion of said object model.

11. A system for printing an object, comprising:
   an additive manufacturing device comprising a digital micromirror unit, wherein said additive manufacturing device is configured to print said object from a photoreactive resin at least in part by selectively applying light from said digital micromirror unit to said photoreactive resin; and
   a data processor configured to (i) receive an object model corresponding to said object in a coordinate space, (ii) use said object model to generate a cross-sectional image, wherein said cross-sectional image is rotated at an angle relative to a cross-section of said object model in said coordinate space, and wherein said cross-sectional image comprises a plurality of pixels, and (iii) map said plurality of pixels of said cross-sectional image to corresponding mirrors of a plurality of mirrors of said digital micromirror unit, to provide an additive manufacturing image usable by said additive manufacturing device to print at least a portion of said object.

12. The system of claim 11, wherein said plurality of mirrors is arranged in a two-dimensional grid, wherein edges of each mirror of the plurality of mirrors are oriented at said angle relative to said two-dimensional grid.

13. The system of claim 11, wherein said angle is about 45 degrees.

14. The system of claim 11, wherein said mapping in (iii) comprises, for each pixel of said plurality of pixels, (a) performing a first function to determine an X-value along an X-axis of the digital micromirror unit and (b) performing a second function to determine a Y-value along a Y-axis of the digital micromirror unit.

15. The system of claim 11, wherein an image resolution of said cross-sectional image is based at least in part on a resolution of said digital micromirror unit.

16. The system of claim 15, wherein said image resolution is greater than said resolution of said digital micromirror unit.

17. The system of claim 15, wherein said image resolution has a first dimension in pixels and a second dimension in pixels, wherein each of said first dimension and said second dimension is determined by a number of mirrors along a width of said digital micromirror unit plus half a number of mirrors along a height of said digital micromirror unit.

18. The system of claim 11, wherein, in (ii), said data processor is further configured to perform filtering and resampling of one or more pixels of said plurality of pixels of said cross-sectional image.

19. The system of claim 18, wherein said data processor is further configured to (i) analyze at least a portion of said object model and (ii) determine whether to perform said filtering and said resampling based at least in part on said analyzing.

20. The system of claim 19, wherein said analyzing comprises analyzing one or more features or surfaces of said at least said portion of said object model.

* * * * *